US009612152B2

(12) United States Patent
deJong et al.

(10) Patent No.: US 9,612,152 B2
(45) Date of Patent: Apr. 4, 2017

(54) AMBIENT LIGHT SENSOR WITH INTERNAL LIGHT CANCELLATION

(71) Applicant: Apple Inc., Cupertino, CA (US)

(72) Inventors: Erik G. deJong, San Francisco, CA (US); Jean-Pierre S. Guillou, San Francisco, CA (US); Koorosh Aflatooni, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 556 days.

(21) Appl. No.: 14/074,547

(22) Filed: Nov. 7, 2013

(65) Prior Publication Data

US 2015/0122978 A1  May 7, 2015

(51) Int. Cl.
  *G01J 1/42*  (2006.01)
  *G01J 1/04*  (2006.01)
  *G01J 1/32*  (2006.01)

(52) U.S. Cl.
  CPC .......... *G01J 1/4204* (2013.01); *G01J 1/0429* (2013.01); *G01J 1/32* (2013.01)

(58) Field of Classification Search
  CPC .......... G01J 1/4204; G01J 1/0429; G01J 1/32
  See application file for complete search history.

(56) References Cited

U.S. PATENT DOCUMENTS

| 5,486,840 A | 1/1996 | Borrego et al. |
| 7,128,951 B2 | 10/2006 | Takeuchi et al. |
| 7,274,418 B2 * | 9/2007 | Gurevich ............ G02F 1/13338 349/114 |
| 7,278,624 B2 * | 10/2007 | Iott ......................... E03C 1/057 251/129.04 |
| 7,453,057 B2 * | 11/2008 | Drummond ............. B60R 1/088 250/205 |
| 7,965,443 B2 * | 6/2011 | Martin ................. G02B 27/281 359/371 |
| 8,217,572 B2 | 7/2012 | Hirakata et al. |
| 8,567,955 B2 * | 10/2013 | Amm .................... G06F 1/1605 348/207.1 |
| 8,915,596 B2 * | 12/2014 | Amm .................... G06F 1/1605 348/207.1 |
| 2006/0152209 A1 * | 7/2006 | Sasaki ................. G01R 15/241 324/96 |

(Continued)

FOREIGN PATENT DOCUMENTS

JP  2009229908  10/2009

*Primary Examiner* — John Lee
(74) *Attorney, Agent, or Firm* — Blakely, Sokoloff, Taylor & Zafman LLP

(57) ABSTRACT

An electronic device includes a transparent surface, a light emitting device that emits light through the transparent surface, and a light sensor for receiving ambient light and providing an ambient light value. A retarder and a linear polarizer are placed between the transparent surface and the light emitting device. The retarder and linear polarizer may attenuate internal reflections from the transparent surface. The light sensor may have two channels and a second linear polarizer may attenuate the ambient light directed toward a second channel. A second retarder may be used with the second linear polarizer to attenuate the ambient light directed toward the second channel. A light detection circuit may use the difference between the two channels of the light sensor to provide the ambient light value.

7 Claims, 2 Drawing Sheets

(56) References Cited

U.S. PATENT DOCUMENTS

| | | | |
|---|---|---|---|
| 2006/0237674 A1* | 10/2006 | Iott | E03C 1/057 |
| | | | 251/129.04 |
| 2008/0006762 A1* | 1/2008 | Fadell | G01J 1/4204 |
| | | | 250/201.1 |
| 2011/0043503 A1* | 2/2011 | Hadwen | G01J 1/1626 |
| | | | 345/207 |
| 2011/0121181 A1* | 5/2011 | Costello | G01S 7/4813 |
| | | | 250/338.1 |
| 2011/0133941 A1* | 6/2011 | Yao | G01J 1/02 |
| | | | 340/600 |
| 2011/0216271 A1* | 9/2011 | Suzuki | G02F 1/13362 |
| | | | 349/71 |
| 2012/0001841 A1* | 1/2012 | Gokingco | G01J 1/32 |
| | | | 345/102 |
| 2012/0056091 A1* | 3/2012 | Mahowald | G01J 1/02 |
| | | | 250/340 |
| 2012/0170284 A1* | 7/2012 | Shedletsky | G02F 1/13318 |
| | | | 362/355 |
| 2012/0243091 A1 | 9/2012 | Amm et al. | |
| 2013/0076712 A1* | 3/2013 | Zheng | G01J 1/32 |
| | | | 345/207 |
| 2013/0106813 A1* | 5/2013 | Hotelling | G06F 1/3265 |
| | | | 345/207 |
| 2014/0055856 A1* | 2/2014 | Amm | G06F 1/1605 |
| | | | 359/492.01 |
| 2014/0152703 A1* | 6/2014 | Yang | G09G 5/10 |
| | | | 345/690 |
| 2015/0122978 A1* | 5/2015 | deJong | G01J 1/4204 |
| | | | 250/225 |

* cited by examiner

AMBIENT LIGHT SENSOR WITH INTERNAL LIGHT CANCELLATION

BACKGROUND

Field

Embodiments of the invention relate to the field of ambient light sensors; and more specifically, to ambient light sensors with cancellation of internal light sources.

Background

Electronic devices may include devices that emit light and devices that sense light. For example, a device may provide a display screen, such as a light emitting diode (LED) panel, and an ambient light sensor that detects an ambient light level that in turn is used to control the brightness of the display screen. It is necessary to avoid having light from the devices that emit light fall on the devices that sense light to provide accurate sensing. This may be done by physically separating the devices that emit light from the devices that sense light. For example, the devices that emit light may be viewed through apertures in a device housing that are separate from other apertures in the device housing that admit light to the devices that sense light.

Generally it is desirable to minimize the number of apertures in the device housing both to better seal the housing for the protection of the contained components and to improve the aesthetics of the housing. A display screen and other devices that emit light are sometimes mounted below a transparent surface that forms a surface of the device housing. It would be desirable to provide a structure that allows devices that emit light and devices that sense light to be mounted below the same transparent surface of the device housing while minimizing the effect of light from the devices that emit light on the devices that sense light to provide accurate sensing.

SUMMARY

An electronic device includes a transparent surface, a light emitting device that emits light through the transparent surface, and a light sensor for receiving ambient light and providing an ambient light value. A retarder and a linear polarizer are placed between the transparent surface and the light emitting device. The retarder and linear polarizer may attenuate internal reflections from the transparent surface. The light sensor may have two channels and a second linear polarizer may attenuate the ambient light directed toward a second channel. A second retarder may be used with the second linear polarizer to attenuate the ambient light directed toward the second channel. A light detection circuit may use the difference between the two channels of the light sensor to provide the ambient light value.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

Figure 1:
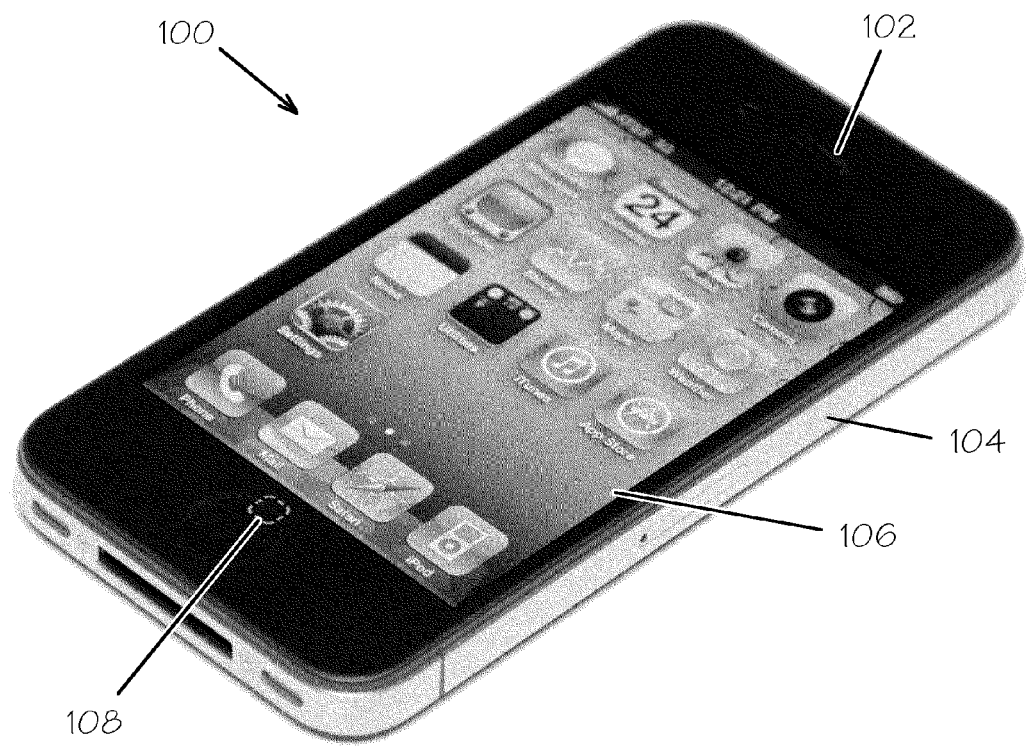
FIG. 1 is a pictorial view of an electronic device 100 that embodies the invention.

FIG. 1 shows a pictorial view of an electronic device 100 that embodies the invention. The electronic device 100 includes a transparent surface 102 that forms a wall of the housing 104 that encloses the device. A light emitting device 106 is located in the housing 104 such that light is emitted through the transparent surface 102. For example, the light emitting device 106 may be a display screen that is viewable through the transparent surface 102 as shown in the figure. A light sensor 108 is also located in the housing 104 such that ambient light falling on at least a portion of the transparent surface 102 is received by the light sensor to provide an ambient light value responsive to the level of ambient light.

Figure 2:
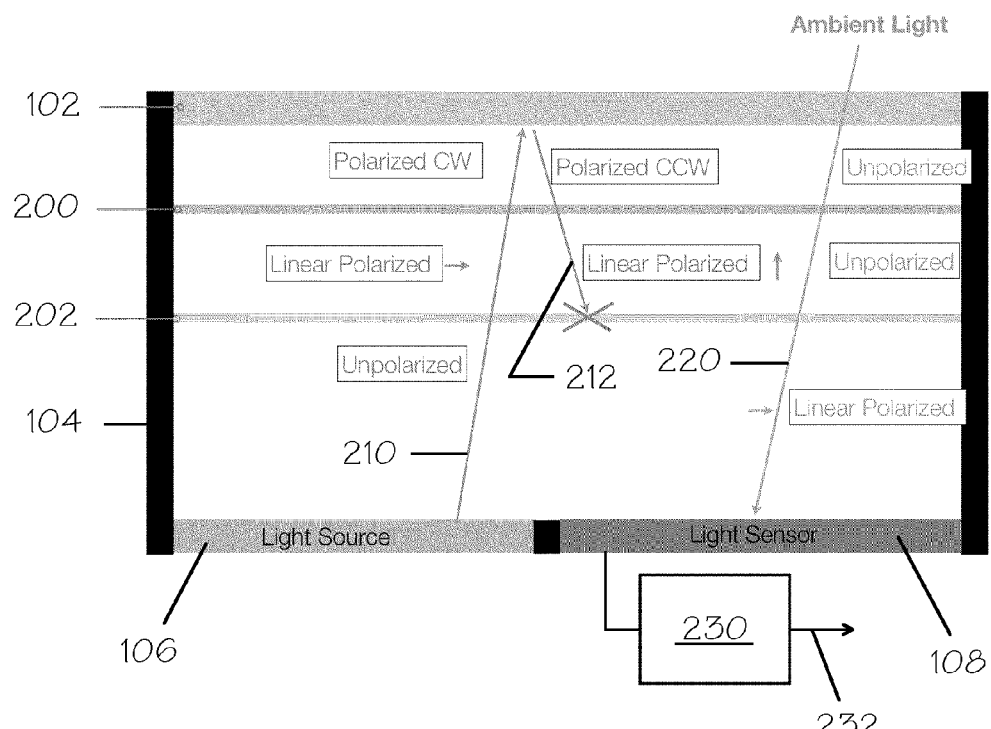
FIG. 2 is a schematic representation of a cross-section of an electronic device that embodies the invention.

FIG. 2 shows a schematic representation of a cross-section of an electronic device that embodies the invention. A retarder 200 and a linear polarizer 202 are placed between the transparent surface 102 and the light emitting device 106. Ambient light 220 passes through the retarder 200 and the linear polarizer 202 after passing through the transparent surface 102 to reach the light sensor 108. The retarder may provide a nominal quarter wave retardation to transform linearly polarized light to circularly polarized light. The retarder may be a birefringent material such as a stretched polymer (PET, COP etc.) or a birefringent inorganic (Quartz, Sapphire, etc.).

In the embodiment shown in FIG. 2, the linear polarizer 202 is between the retarder 200 and the light emitting device 106 such that the ambient light 220 passes through the transparent surface 102, then the retarder 200, and then the linear polarizer 202 before being received by the light sensor 108.

In the embodiment shown in FIG. 2, the light sensor 108 is adjacent the light emitting device 106. A photosensitive surface of the light sensor 108 is at substantially the same distance from the transparent surface 102 as a light emitting surface of the light emitting device 106, such that light emitted by the light emitting device is not directly incident on the photosensitive surface of the light sensor. It will be appreciated that the light sensor may be located in other ways so that light emitted by the light emitting device is not directly incident on the photosensitive surface of the light sensor.

Light 210 that is emitted by the light emitting device 106 and reflected internally by the transparent surface 102 is attenuated by the retarder 200 and linear polarizer 202 so that the effect of the internally reflected light 212 on the light sensor 108 is minimized. The emitted light 210 first passes through the linear polarizer 202 and only linearly polarized light emerges. The emerging light is polarized in a first direction as determined by the linear polarizer 202. The linearly polarized light then passes through the retarder 200 and emerges as circularly polarized light with a given handedness, for example right hand circularly polarized. The circularly polarized light then passes through the transparent surface 102.

However, depending on the angle of incidence with the transparent surface 102, all or some portion of the incident emitted light 210 that is circularly polarized may be internally reflected by the transparent surface 102. The internally reflected light 212 is circularly polarized with an opposite handedness from the circularly polarized incident emitted light 210, for example left hand circularly polarized. The internally reflected light 212 that is now circularly polarized then passes through the retarder 200 and emerges as linearly polarized light. Because the internally reflected light 212 is circularly polarized with the opposite handedness from the circularly polarized incident emitted light 210, the internally reflected light 212 emerges from the retarder 200 linearly polarized in a second direction that is orthogonal to the first direction of linear polarization of the emitted light 210 that emerges from the linear polarizer 202. The emerging linearly polarized internally reflected light 212 is therefore substantially attenuated by the linear polarizer 202. Thus little of the emitted light 210 that is emitted by the light emitting device 106 and reflected internally by the transparent surface 102 reaches the light sensor 108. The attenuation of the emerging linearly polarized internally reflected light 212 depends on extinction ration of the polarizer, and birefringence of the path that light travels. An extinction ratio of 100:1 or higher is achievable.

Figure 3:
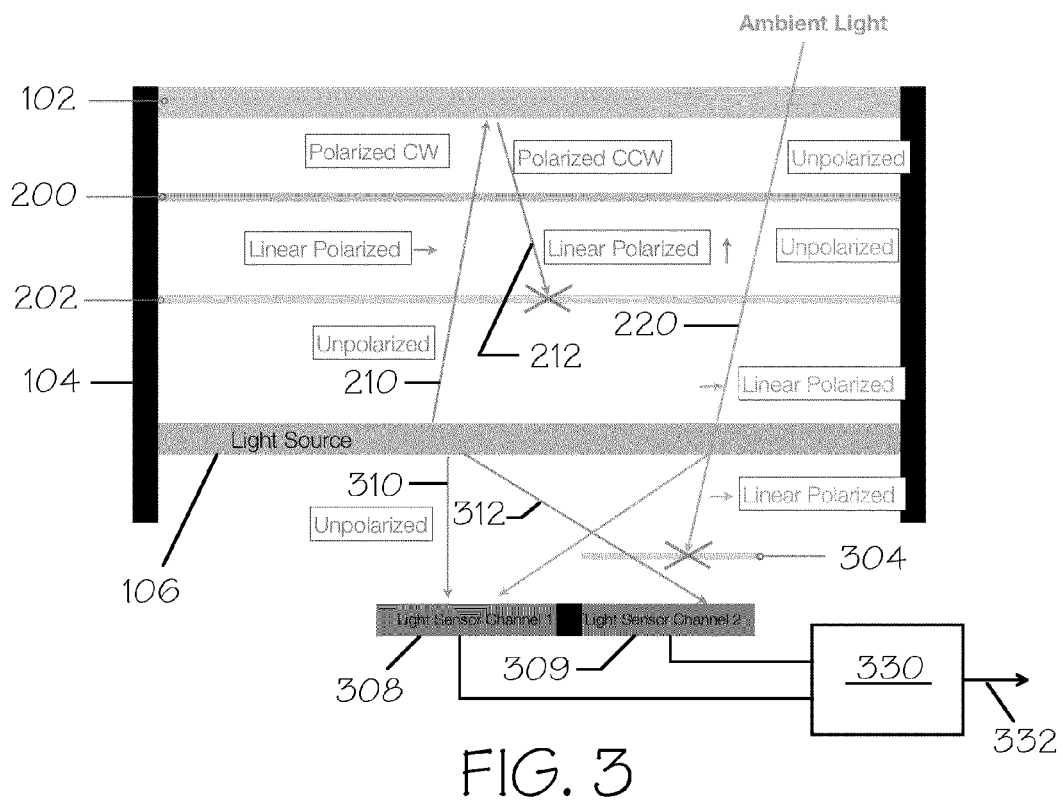
FIG. 3 is a schematic representation of a cross-section of another electronic device that embodies the invention.

FIG. 3 shows a schematic representation of a cross-section of another electronic device that embodies the invention. A first linear polarizer 202 is between the retarder 200 and the light emitting device 106 such that the ambient light 220 passes through the transparent surface 102, then the retarder 200, and then the first linear polarizer 202 before being received by the light sensor 308. Light 210 that is emitted by the light emitting device 106 and reflected internally by the transparent surface 102 is attenuated before reaching the light sensor 308 as described above for the embodiment shown in FIG. 2.

In the embodiment shown in FIG. 3, the light sensor 308 is located such that some light 310, 312 emitted by the light emitting device 106 is directly incident on the photosensitive surface of the light sensor. The light sensor has two channels 308, 309. Ambient light 220 and light 310 emitted by the light emitting device 106 reaches the first channel 308 of the light sensor to produce a first light level value.

The ambient light 220 is linearly polarized by the first linear polarizer 202. A second linear polarizer 304 attenuates the ambient light 220 directed toward a second channel 309 of the light sensor because the second linear polarizer is oriented orthogonally to the first linear polarizer 202. The amount of ambient light 220 that is not attenuated by the second linear polarizer 304 and which therefore reaches the second channel 309 of the light sensor is negligible. Thus, primarily light 312 emitted by the light emitting device 106 reaches the second channel 309 of the light sensor. The second channel 309 of the light sensor produces a second light level value that is responsive to the amount of light 312 emitted by the light emitting device 106.

The first light level value produced by the ambient light that falls on the first channel 308 of the light sensor will be approximately double the second light level value produced by the ambient light that passes through the second linear polarizer 304 and then falls on the second channel 309 of the light sensor. The ratio of the first light level value to the second light level value can be calibrated. The difference between the first light level value and the second light level value can be used to remove the effect of the light 310, 312 emitted by the light emitting device 106 when determining the ambient light level.

An ambient light detection circuit 330 is coupled to first channel 308 and the second channel 309 of the light sensor. The ambient light detection circuit 330 provides an ambient light level value 332 responsive to the difference between the first light level value and the second light level value. The ambient light level value 332 is indirectly responsive to amount of ambient light 220 reaching the first channel 308 of the light sensor because the effect of the light 312 emitted by the light emitting device 106 is cancelled by taking the difference between the two channels of the light sensor. The ambient light level values may be analog voltages, digitally encoded values, or other representations of the ambient light level as may be used by ambient light detection circuit 330 and/or the other circuits within the electronic device 100.

Figure 4:
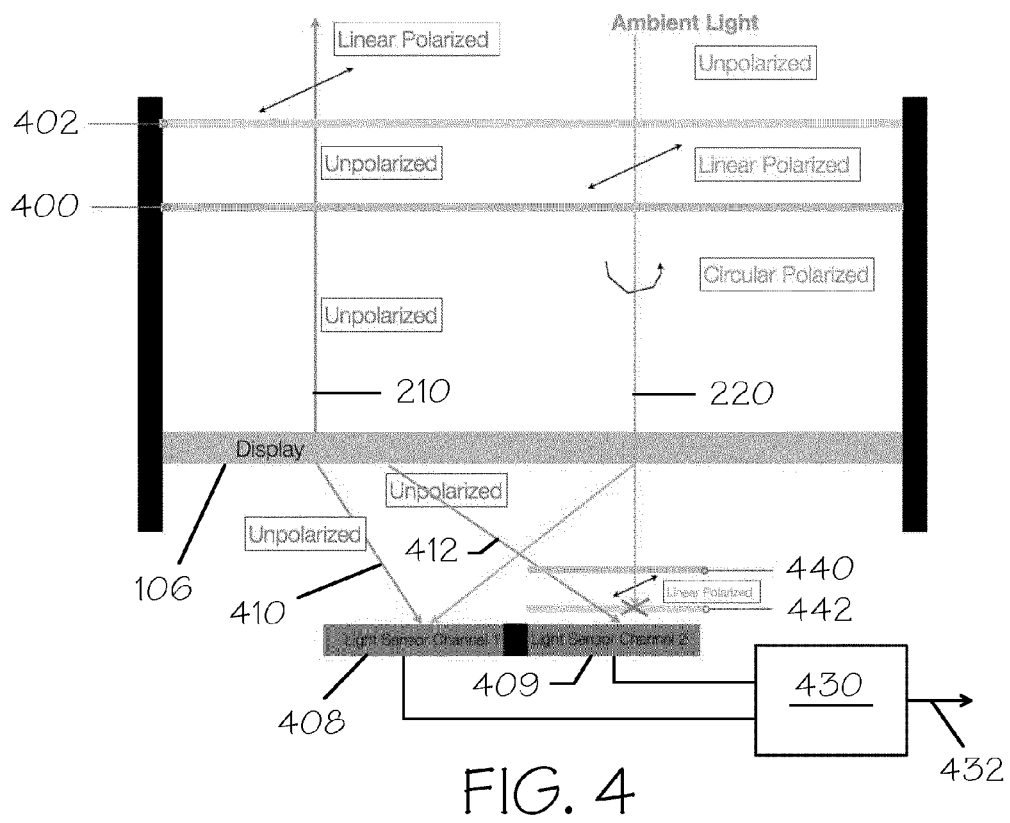
FIG. 4 is a schematic representation of a cross-section of yet another electronic device that embodies the invention.

FIG. 4 shows a schematic representation of a cross-section of yet another electronic device that embodies the invention. A first retarder 400 is between a first linear polarizer 402 and the light emitting device 106. The first retarder 400 may also provide additional benefits such as reducing the reflectance of the light emitting device's internal layers such as wires, and traces. Ambient light 220 passes through the first linear polarizer 402 and then the first retarder 400 before being received by the light sensor 408.

In the embodiment shown in FIG. 4, the light sensor 408 is located such that some light 410, 412 emitted by the light emitting device 106 is directly incident on the photosensitive surface of the light sensor. The light sensor has two channels 408, 409. Ambient light 220 and light 410 emitted by the light emitting device 106 reaches the first channel 408 of the light sensor to produce a first light level value.

The ambient light 220 is linearly polarized by the first linear polarizer 402 and then circularly polarized by the first retarder 400. A second retarder 440 is in the path of the ambient light 220 directed to the second channel 409 of the light sensor. The second retarder 440 has the opposite handedness from the first retarder 400. The second retarder 440 linearly polarizes the circularly polarized ambient light 220 orthogonally to the direction of polarization by the first linear polarizer 402.

A second linear polarizer 442 attenuates the ambient light 220 directed toward the second channel 409 of the light sensor because the second linear polarizer is oriented orthogonally to the direction of polarized light emanating from the second retarder 440. Thus, primarily light 412 emitted by the light emitting device 106 reaches the second channel 409 of the light sensor. The amount of ambient light 220 that is not attenuated by the second linear polarizer 442 and which therefore reaches the second channel 409 of the light sensor is negligible. The second channel 409 of the light sensor produces a second light level value that is responsive to the amount of light 412 emitted by the light emitting device 106.

An ambient light detection circuit 430 is coupled to first channel 408 and the second channel 409 of the light sensor. The ambient light detection circuit 430 provides an ambient light level value 432 responsive to the difference between the first light level value and the second light level value. The ambient light level value 432 is indirectly responsive to amount of ambient light 220 reaching the first channel 408 of the light sensor because the effect of the light 410 emitted by the light emitting device 106 is cancelled by taking the difference between the two channels of the light sensor adjusted for the attenuation of the light emitted by the light emitting device by the second retarder 440 and the second linear polarizer 442.

The portion of the first light level value produced by the light 410 emitted by the light emitting device 106 that falls on the first channel 408 of the light sensor will be approximately double the second light level value produced by the light emitted by the light emitting device that passes through the second retarder 440 and the second linear polarizer 442 and then falls on the second channel 409 of the light sensor. The ratio of the first light level value to the second light level value can be calibrated. The ambient light level values may be analog voltages, digitally encoded values, or other representations of the ambient light level as may be used by ambient light detection circuit 430 and/or the other circuits within the electronic device 100.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. An electronic device comprising:
    a transparent surface;
    a light sensor;
    a light emitting device between the transparent surface and the light sensor, the light emitting device to emit light through the transparent surface;
    a first retarder between the transparent surface and the light emitting device;
    a first linear polarizer between the first retarder and the light emitting device;
    wherein the light sensor is for receiving ambient light that passes through the transparent surface, then the first retarder, and then the first linear polarizer, the light sensor including
        a first channel for receiving both light from the light emitting device and ambient light, and to provide a first light level value, and
        a second channel with a second linear polarizer oriented to attenuate ambient light that has been polarized by the first linear polarizer, the second channel for receiving light from the light emitting device, and to provide a second light level value.

2. The electronic device of claim 1 further comprising an ambient light detection circuit coupled to the light sensor, the ambient light detection circuit configured to provide an ambient light level value responsive to a difference between the first light level value and the second light level value.

3. A method for detecting an ambient light level falling on a transparent surface of an electronic device with a light sensor, the electronic device including a light emitting device between the light sensor and the transparent surface, the light emitting device to emit light through the transparent surface, the method comprising:
    placing a first retarder between the transparent surface and the light emitting device;
    placing a first linear polarizer between the first retarder and the light emitting device;
    receiving ambient light that falls on the transparent surface and then passes through the transparent surface, then the first retarder, and then the first linear polarizer with a first channel of the light sensor, the first channel also receiving the light emitted by the light emitting device;
    receiving the light emitted by the light emitting device with a second channel of the light sensor;
    attenuating ambient light directed to the second channel with a second linear polarizer; and
    providing an ambient light level value responsive to a difference between the first channel and the second channel.

4. An electronic device comprising:
    a transparent surface;
    means for sensing light
    means for emitting light through the transparent surface, the means for emitting light placed between the means for sensing light and the transparent surface;
    first means for circularly polarizing light placed between the transparent surface and the means for emitting light;
    first means for linearly polarizing light placed between the transparent surface and the means for emitting light; and
    means for receiving ambient light and also receiving light emitted by the means for emitting light, the ambient light falling on the transparent surface and then passing through the first transparent surface, the means for circularly polarizing light, and the means for linearly polarizing light;
    means for receiving only the light emitted by the means for emitting light means for attenuating ambient light directed to the means for receiving only the light emitted by the means for emitting light and
    means for providing an ambient light level value responsive to a difference between the means for receiving ambient light and also receiving light emitted by the means for emitting light and the means for receiving only the light emitted by the means for emitting light.

5. An electronic device comprising:
a transparent surface;
a light sensor;
a light emitting device between the transparent surface and the light sensor, the light emitting device to emit light through the transparent surface;
a first linear polarizer between the transparent surface and the light emitting device;
a first retarder between the first linear polarizer and the light emitting device;
wherein the light sensor is positioned to receive ambient light that passes through the transparent surface, then the first linear polarizer, and then the first retarder, the light sensor including
a first channel positioned to receive light from both the light emitting device and ambient light, and configured to provide a first light level value, and
a second channel with a second retarder and a second linear polarizer oriented to attenuate ambient light that has been linearly polarized by the second retarder, the second channel positioned to receive light from the light emitting device, and configured to provide a second light level value.

6. The electronic device of claim 5 further comprising an ambient light detection circuit coupled to the light sensor, the ambient light detection circuit configured to provide an ambient light level value responsive to a difference between the first light level value and the second light level value.

7. A method for detecting an ambient light level falling on a transparent surface of an electronic device with a light sensor, the electronic device including a light emitting device between the light sensor and the transparent surface, the light emitting device emitting light through the transparent surface, the method comprising:
placing a first linear polarizer between the transparent surface and the light emitting device;
placing a first retarder between the first linear polarizer and the light emitting device;
receiving ambient light that falls on the transparent surface and then passes through the transparent surface, then the first linear polarizer, and then the first retarder with a first channel of the light sensor, the first channel also receiving light emitted by the light emitting device;
receiving the light emitted by the light emitting device with a second channel of the light sensor;
attenuating ambient light directed to the second channel with a second retarder and a second linear polarizer; and
providing an ambient light level value responsive to a difference between the first channel and the second channel.

* * * * *